United States Patent
Oreans et al.

[11] Patent Number: 6,032,608
[45] Date of Patent: Mar. 7, 2000

[54] POINTER INDICATOR

[75] Inventors: Derk Oreans, Stockstadt; Bernhard Herzog, Stuttgart, both of Germany

[73] Assignee: Robert Bosch GmbH, Stuttgart, Germany

[21] Appl. No.: 09/011,926
[22] PCT Filed: May 9, 1997
[86] PCT No.: PCT/DE97/00935
   § 371 Date: Feb. 17, 1998
   § 102(e) Date: Feb. 17, 1998
[87] PCT Pub. No.: WO97/49090
   PCT Pub. Date: Dec. 24, 1997

[30] Foreign Application Priority Data

Jun. 17, 1996 [DE] Germany ............ 196 24 081

[51] Int. Cl.⁷ .................................. G01D 11/28
[52] U.S. Cl. ........................... 116/288; 362/26
[58] Field of Search .................. 116/284, 286, 116/287, 288; 362/23, 26, 27, 28, 29, 31

[56] References Cited

U.S. PATENT DOCUMENTS

| | | | |
|---|---|---|---|
| 2,902,970 | 9/1959 | Kadlec | 362/29 |
| 4,218,726 | 8/1980 | Fukasawa et al. | 116/288 |
| 4,274,358 | 6/1981 | Nakanura et al. | 116/288 |
| 4,339,400 | 7/1982 | Sorko-Ram | 264/1.9 |
| 4,872,415 | 10/1989 | Nakadozono et al. | 362/26 |
| 4,959,759 | 9/1990 | Kohler | 362/26 |
| 5,199,376 | 4/1993 | Pasco | 116/288 |
| 5,291,851 | 3/1994 | Muramatsu | 116/286 |
| 5,458,082 | 10/1995 | Cookingham | 116/288 |
| 5,546,888 | 8/1996 | Skiver et al. | 362/23 |
| 5,690,049 | 11/1997 | Marshall et al. | 116/284 |

FOREIGN PATENT DOCUMENTS

| | | | |
|---|---|---|---|
| 2 672 676 | 9/1992 | France . | |
| 2 710 978 | 4/1995 | France . | |
| 32 01 571 | 7/1983 | Germany . | |
| 33 47 014 | 7/1985 | Germany . | |
| 3-259714 | 11/1991 | Japan | 362/23 |
| 8-193852 | 7/1996 | Japan . | |

*Primary Examiner*—Andrew Hirshfeld
*Attorney, Agent, or Firm*—Kenyon & Kenyon

[57] ABSTRACT

A pointer device having an illuminated pointer made of light-guiding material, mounted rotatably about a pointer axis, having a permanently mounted light source whose light is coupled axially into the illuminated pointer. The illuminated pointer includes a radial section which constitutes a pointer vane, and an axial section which constitutes a light gatherer. Light deflection from the axial section to the radial section takes place via a reflective surface and a first-surface mirror.

3 Claims, 1 Drawing Sheet

POINTER INDICATOR

BACKGROUND INFORMATION

A pointer device is described in German Patent No. DE 33 47 014 C2. This pointer device has a pointer, mounted rotatably about a pointer axis, which is made of transparent light-guiding material. Permanently mounted on the side of the pointer facing away from the observer is a light source whose light is coupled, axially with respect to the pointer axis, into the light-guiding material of the illuminated pointer. The light coupled in axially in this fashion can be deflected via a light-guiding insert into the radial longitudinal extension direction of the pointer.

SUMMARY OF THE INVENTION

The pointer device according to the present invention has, as compared with the existing art, the advantage that the illumination density of a passive illuminated pointer is considerably increased. This offers the advantage, in cases in which very good illumination of the pointer is necessary, of also being able to use a passive illuminated pointer, and not utilizing a considerably more expensive active illuminated pointer. The arrangement combines the practically loss-free total reflection of rays which strike at a large angle to the perpendicular to the surface with the additional reflection of rays which strike at a small angle to the perpendicular to the surface.

DETAILED DESCRIPTION

Figure 1:
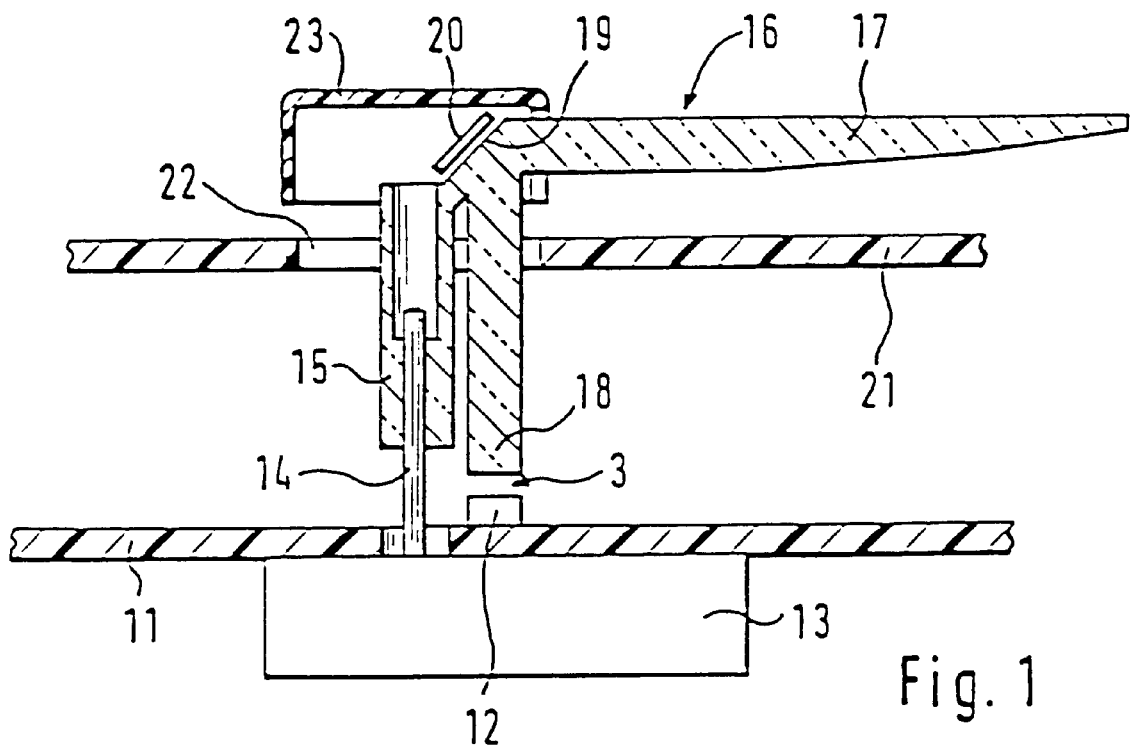
FIG. 1 shows an exemplary embodiment of the pointer device according to the present invention.

FIG. 1 shows a pointer arrangement with a passive illuminated pointer. Here, in contrast to an active illuminated pointer, the light source is not integrated into the pointer itself, but rather the light is coupled into the rotatably mounted illuminated pointer from a permanently mounted light source. In FIG. 1, multiple LEDs 12 are mounted on a circuit board 11, only one individual LED being depicted here for the sake of simplicity. These multiple LEDs 12 are preferably mounted and contacted on the circuit board with a spacing of approximately 60 degrees. Located on the side of the circuit board facing away from the observer is a meter mechanism 13 which drives a pointer shaft 14 which passes through an opening in circuit board 11. Illuminated pointer 16 is attached with its pointer hub 15 onto pointer shaft 14. The pointer hub 15 and illuminated pointer 16 are shaped integrally from a light guide. Illuminated pointer 16 itself includes a radial section enclosing a right angle, which represents pointer vane 17, and an axial section which constitutes a light gatherer 18. In this context, light from LEDs 12 is coupled axially into light gatherer 18 and then deflected at reflective surface 19, by total reflection, into the radial pointer vane 17. A first-surface mirror 20 is provided parallel to reflective surface 19 at a small spacing from reflective surface 19. Located on the side of illuminated pointer 16 facing away from the observer is dial face 21, which has an opening 22 through which pointer hub 15 and light gatherer 18 pass. Opening 22 in dial face 21, the pointer hub, and the light gatherer are covered by a cap 23. The cap 23 is white in color on the inside so that light emerging from pointer 16 is reflected back into the pointer.

Figure 2:
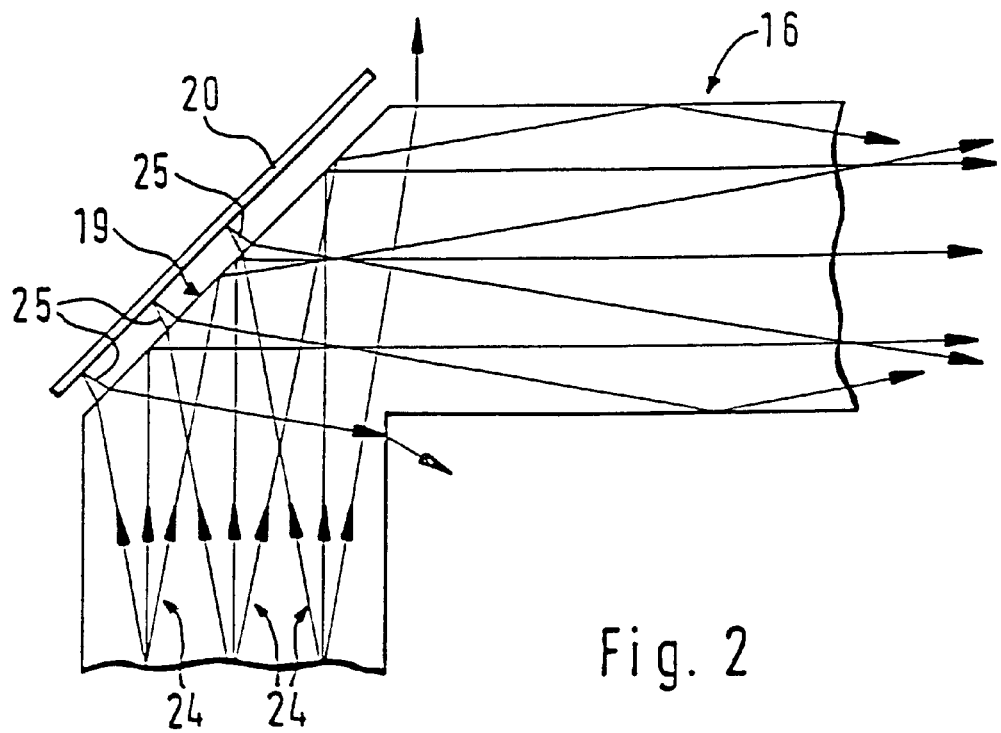
FIG. 2 shows the beam path of the light in the exemplary embodiment depicted in FIG. 1.

The beam path for light deflection out of the axial part of illuminated pointer 16 into the radial part of illuminated pointer 16 is depicted in FIG. 2. Identical parts here are given identical reference characters. The schematic path of light propagation in the light-guiding material of illuminated pointer 16 is indicated with arrows 24. The light emerges from LED 12 (not depicted), and is coupled into the axial light gatherer 18. In addition to reflective surface 19, which already deflects a large portion of the light rays into radial part 17 of illuminated pointer 16, accessory mirror 20 is also provided. Accessory mirror is provided because a portion of the light rays of the LED can emerge from the light-guiding material because of the angle of incidence upon reflective surface 19. Light rays 25 emerging from the light-guiding material are reflected from first-surface mirror 20 back into the light guide, and thus into the radial pointer vane of illuminated pointer 16. With this arrangement it is possible for the light rays which are coupled, substantially by total reflection, into pointer vane 17 because of their large angle of incidence with respect to the perpendicular to reflective surface 19 to be reinforced.

First-surface mirror 20 can, for example, be punched out of a vacuum-metallized plastic film (polycarbonate), and initially placed in a protrusion, provided for the purpose, of cap 23, and thus initially immobilized. It is then finally retained with the insertion of the light guide.

What is claimed is:

1. A pointer device comprising:

an illuminated point composed of a light-guiding material, the illuminated pointer being mounted rotatably about a pointer axis, the illuminated pointer including a radial section and an axial section, the radial section constituting a pointer vane, the axial section constituting a light gatherer, the illuminated pointer including a reflective surface which is positioned to direct light from the axial section to the radial section;

a permanently mounted light source for providing light, the light being coupled axially into the illuminated pointer;

a cap including an internal reflecting surface; and a first-surface mirror being adjacent and spaced from the reflective surface, the first-surface mirror being positioned to direct light exiting the pointer from the reflective surface back into the pointer, wherein a deflection of the light from the axial section to the radial section of the illuminated pointer takes place via the reflective surface, the cap, and the first-surface mirror.

2. The pointer device according to claim 1, wherein the first-surface mirror includes a vacuum-metallized plastic film.

3. The pointer device according to claim 1, wherein the first-surface mirror is positioned between the reflective surface and the internal reflecting surface of the cap.

* * * * *